United States Patent
Sarlak

(10) Patent No.: US 6,302,143 B1
(45) Date of Patent: Oct. 16, 2001

(54) TWO-STAGE SERVO GAS PRESSURE REGULATOR MODULE

(75) Inventor: Mehrdad Sarlak, Crystal, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/398,538

(22) Filed: Sep. 17, 1999

(51) Int. Cl.$^7$ .................................................. G05D 16/06
(52) U.S. Cl. .............................. 137/505.14; 251/129.2; 251/285
(58) Field of Search .................... 137/505.14; 251/129.2, 251/285

(56) References Cited

U.S. PATENT DOCUMENTS

| | | |
|---|---|---|
| 2,443,036 | * 6/1948 | Hopkins . |
| 4,265,270 | * 5/1981 | Satoh ............................. 137/505.39 |
| 4,268,009 | * 5/1981 | Allen, Jr. ......................... 251/129.2 |
| 4,561,631 | * 12/1985 | Slavin et al. ..................... 251/129.2 |
| 4,637,429 | * 1/1987 | Dietiker et al. ................. 137/505.14 |
| 4,819,695 | 4/1989 | Kervagoret . |
| 5,248,124 | * 9/1993 | Nugent ............................ 251/129.11 |
| 5,280,882 | * 1/1994 | Kamiya et al. ............... 251/129.2 X |
| 5,345,963 | * 9/1994 | Dietiker .................................. 137/12 |
| 5,413,141 | * 5/1995 | Dietiker ............................... 137/489 |
| 5,435,343 | * 7/1995 | Buezis ................................. 137/489 |

FOREIGN PATENT DOCUMENTS 317892A  8/1929  (GB) .

\* cited by examiner

*Primary Examiner*—Stephen M. Hepperle

(57) ABSTRACT

A two-stage fluid pressure regulating valve has a solenoid operated lever for moving a regulator shaft between two positions. The regulator shaft biases the regulator spring of a flow rate control diaphragm valve. When the solenoid is actuated the lever is pivoted, applying increased force to the regulator spring, to change the valve set point to its higher pressure output. A return spring returns the arm to the low pressure set point when the solenoid is de-energized. A pair of adjustable stops are positioned for engagement by the lever and forming limits for its motion, for independently adjusting the low and high pressure set points for the valve.

6 Claims, 4 Drawing Sheets

TWO-STAGE SERVO GAS PRESSURE REGULATOR MODULE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO "MICROFICHE APPENDIX"

Not Applicable.

BACKGROUND OF THE INVENTION

1. Field of the Invention

This invention relates generally to fluid pressure regulating valves, and more specifically to two-stage servo gas pressure regulators convertible to separate output pressure ranges, such as those typically used in natural and LP fuel gas controls.

2. Background of the Invention

Fluid pressure regulating valves are widely used in a number of applications. One important application is in the control of gas pressure in gas heating appliances. Typically the heat output such appliances is controlled by metering the combustion gas through an orifice operating on a known and controlled pressure drop. Because the supply conditions for the gas may vary, a pressure regulating valve is used to achieve the known pressure drop, and therefore a known gas flow to the burner. Usually a spring reference is used for maintaining the constant pressure drop, and a service adjustment is provided for fine tuning the regulated pressure. Also, single-stage valve designs are known which facilitate replacement of the reference spring to permit valve conversion for operation with different gases having different characteristics, for example, natural gas and LP gas.

Two-stage gas regulators are used to switch the pressure regulation, and hence the burner heat output, between a low pressure and a higher pressure regulation point. This is often accomplished by a solenoid energized by the heating system control.

Many types of regulating valves have been provided in the prior art to accomplish these tasks. Some have used multiple regulators in one housing, which can lead to complex and expensive assembly. Others have used complex linkages for internal adjustments. Others have provided high and low adjustments which are interrelated, complicating the adjustment process. However, no known two-stage valve designs readily permit reference spring replacement to provide for simple conversion for operation with different gases.

BRIEF SUMMARY OF THE INVENTION

The present invention is a pressure regulating valve with two-stage operation and independent adjustability of low and high regulated pressures. According to the present invention there is provided a regulating valve having a valve housing defining a valve seat and a flow rate control diaphragm mounted in the housing proximate the valve seat for controlling flow therethrough as a function of extension of a regulator spring located between the diaphragm and a spring retainer. Position of the retainer relative to the valve seat is controlled in part by an actuator through a linkage including a pivoting lever. A pair of adjustable stops are positioned to engage the lever and establish limits for its motion, thereby providing the low and high pressure set points for the valve.

The lever may be mounted on a removable cap on the housing, removal of which permits removal of a shaft which carries the regulator spring. The lever may be of a T-shaped configuration, with the shaft, solenoid and stops engaging individual projecting portions of the lever to achieve a compact assembly in which adjustments and conversion are facilitated.

DETAILED DESCRIPTION OF THE INVENTION

Figure 1:
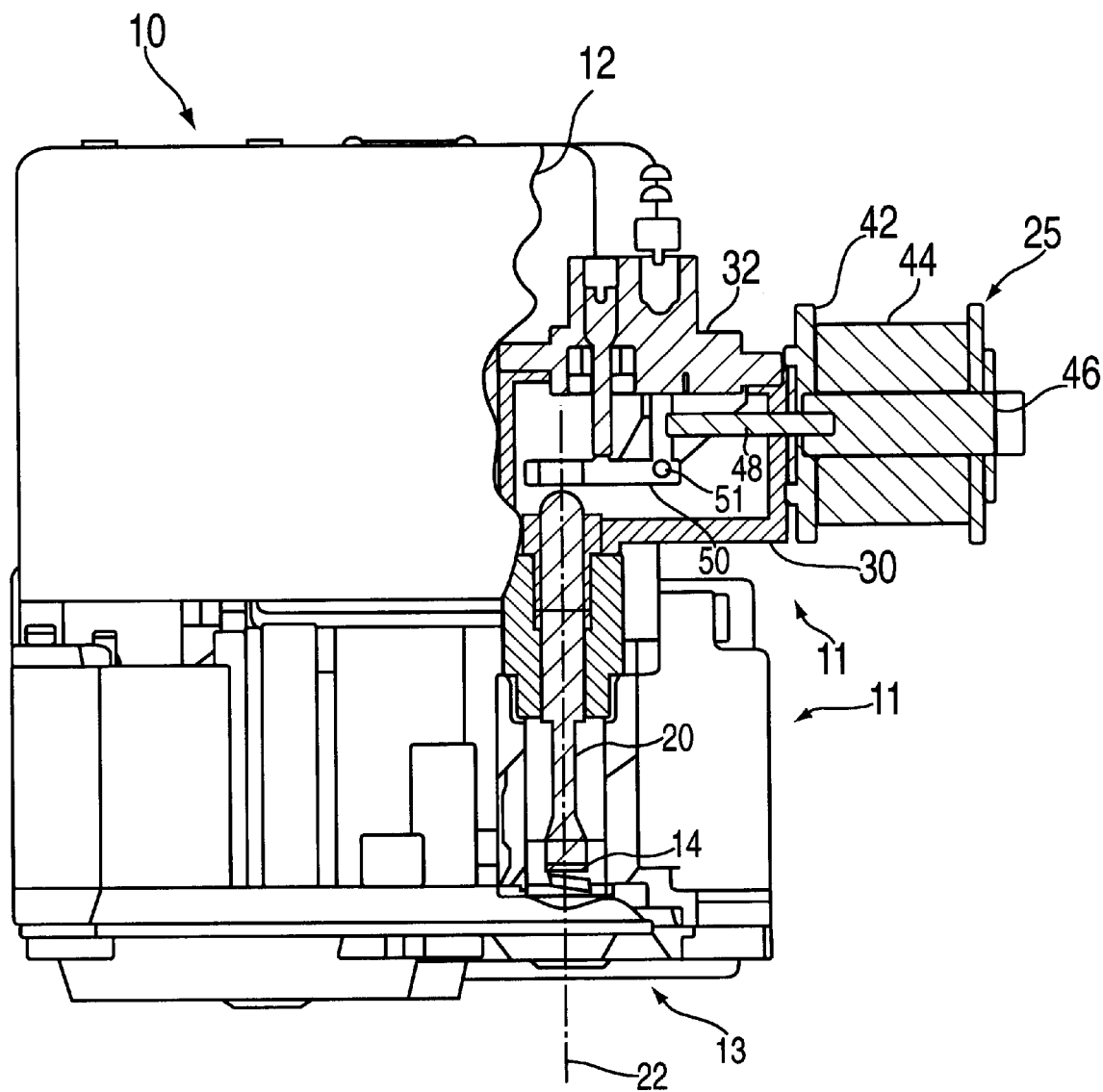
FIG. 1 illustrates a pressure regulating valve according the applicant's invention, with portions broken away to show construction of a two-stage regulator used therein.
Figure 5:
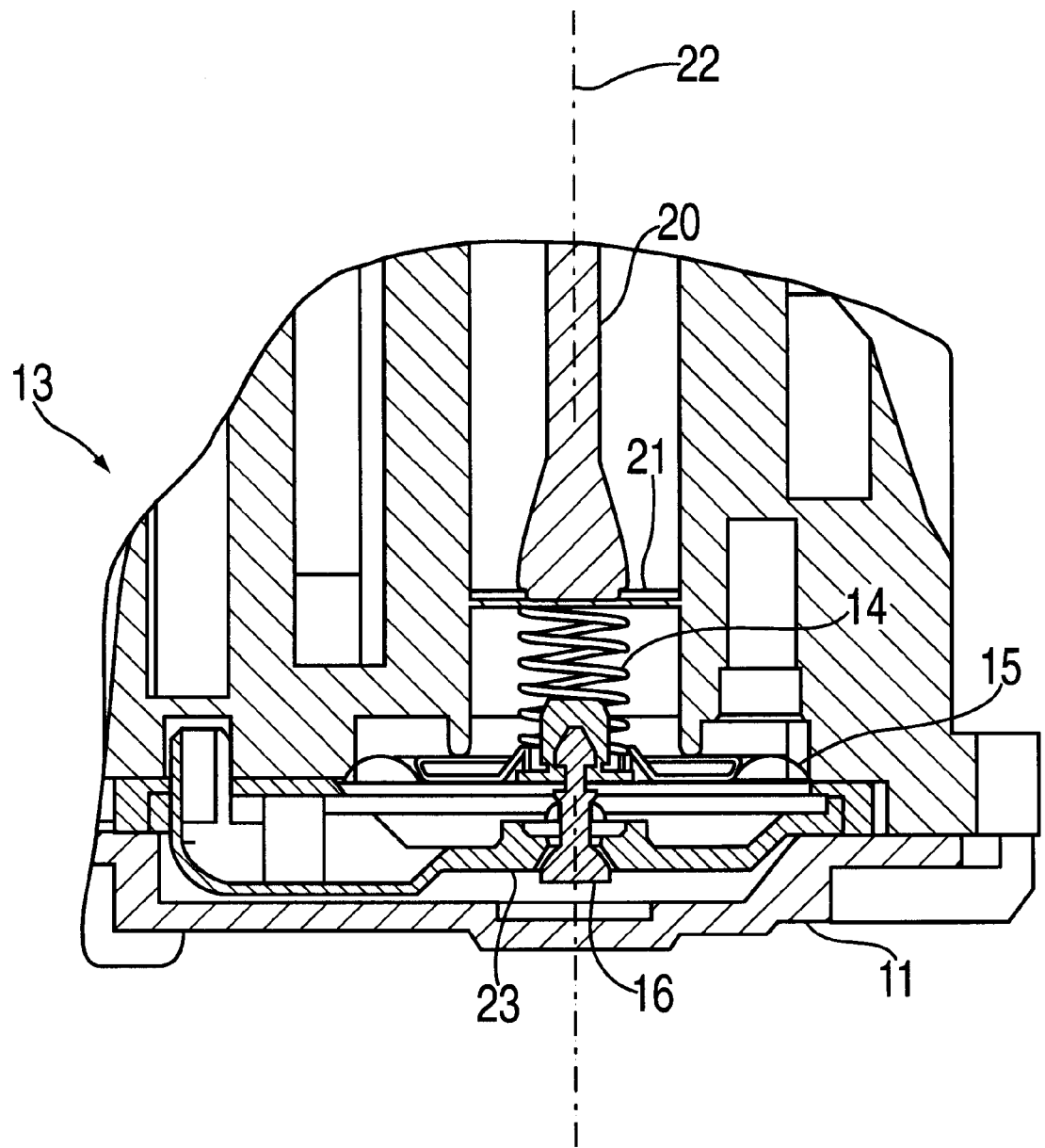
FIG. 5 is an enlarged sectional view of the servo valve portion of the valve of FIG. 1.

Referring to the FIG. 1, reference numeral 10 generally identifies a fluid pressure regulating valve having a portion of its housing assembly 11 broken away along line 12 to illustrate, in the right-hand side of the Figure, components relevant to the two-stage module of the present invention. Reference number 13 identifies a conventional diaphragm-type servo valve (shown in greater detail in FIG. 5), which regulates the control pressure for a main flow control valve according to the force of regulator spring 14. As shown in FIG. 5, one end of this spring bears against a diaphragm assembly 15 which carries a servo valve closure member 16. The other end of regulator spring 14 is secured on a spring retainer 21 on one end of a shaft 20 slideable in housing assembly 11 along an axis 22 toward and away from a servo valve seat 23.

As is explained in greater detail hereinafter, shaft 20 is part of a linkage through which the compression of regulator spring 14 may be varied, in part by an actuator, such as a solenoid 25. When shaft 20 is permitted to move to its upward limit (as seen in FIG. 1), spring 14 applies a minimum force to diaphragm assembly 15, corresponding to a low pressure set point. When shaft 20 is moved to its downward limit, spring 14 is compressed, resulting in application of a higher force to diaphragm 15, corresponding to a high pressure set point.

The two-stage regulator module includes separable housing portions, including a main housing 30 and a cover 32. Main housing 30 may be attached to the remainder of housing assembly 11 by screws or other fastening devices (not shown), and may be designed to replace the cover of an existing single-stage valve of the general type of valve 10, so that it can be field-converted to two-stage operation.

The actuation force for moving shaft 20 to the high pressure set point position is provided by solenoid 25 or other actuator. Solenoid 25 includes a two part frame 42, of which one part is attached to the side of main housing 30. Solenoid 25 also has an excitation coil 44, which is connected to a switchable source of electrical power, through a heating control system (not shown). Solenoid 25 includes armature or plunger 46 having an extension 48 which projects into housing 30 to engage a lever 50 mounted for pivotal movement about an axis 51 transverse to axis 22.

Figure 2:
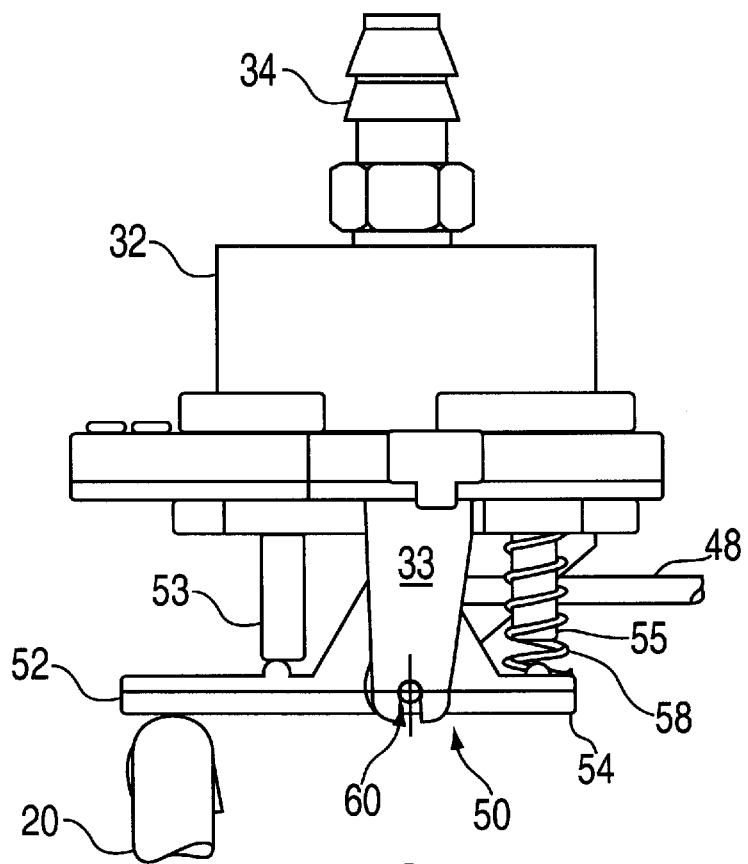
FIG. 2 is an enlarged view of the linkage including a lever, used in the valve of FIG. 1.
Figure 4:
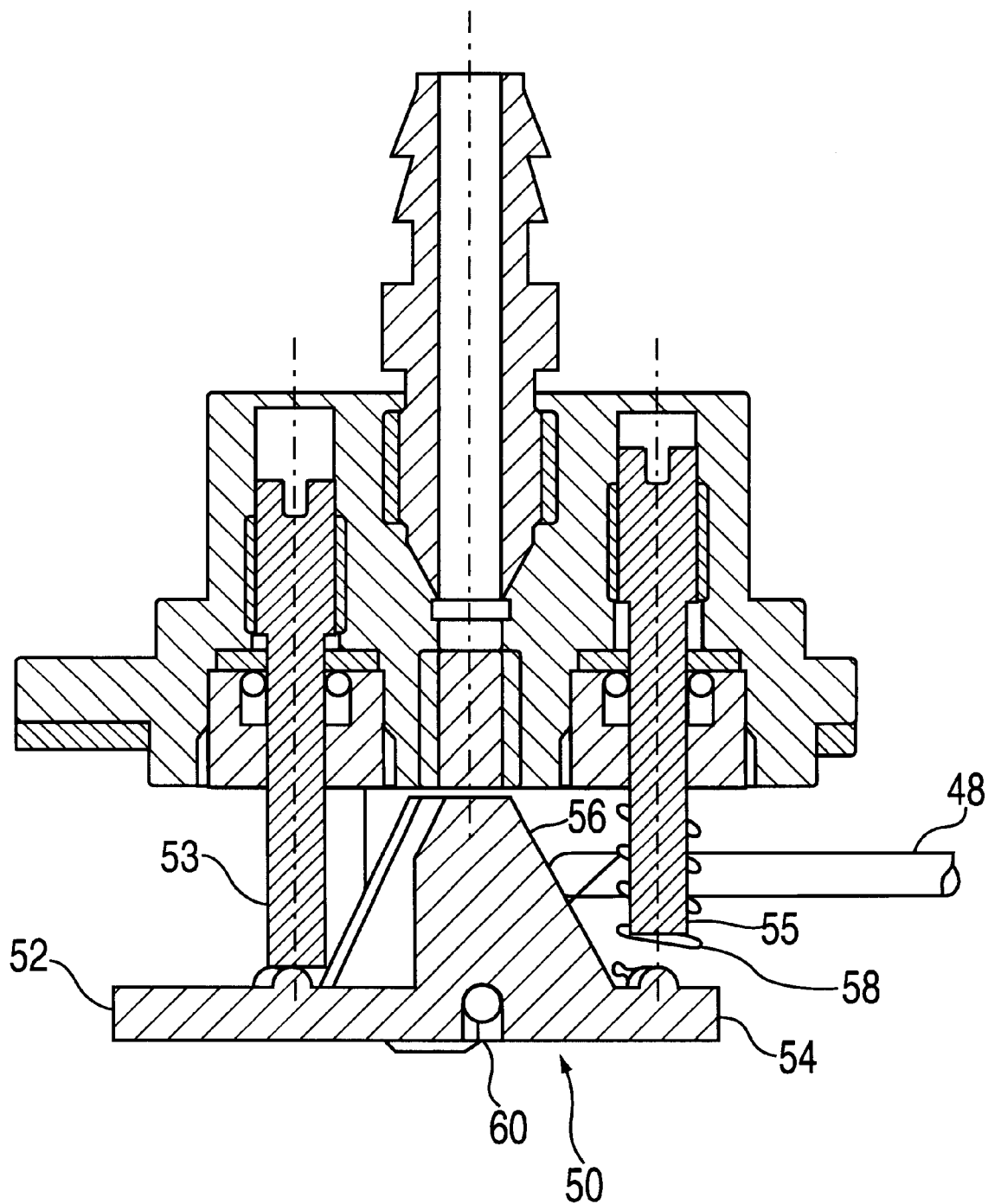
FIG. 4 is a sectional view taken along line 4—4 in FIG. 3.

As seen in best in FIGS. 2 and 4, lever 50 is of a generally T-shaped configuration, and has arms 52 and 54 extending in opposite directions from axis 51, and a leg 56 extending from axis 51 perpendicular to arms 52 and 54. Note that lever 50 appears L-shaped in FIG. 1 because the section is taken through the center of solenoid 25 which is offset along axis 51 from arm 54.

Figure 3:
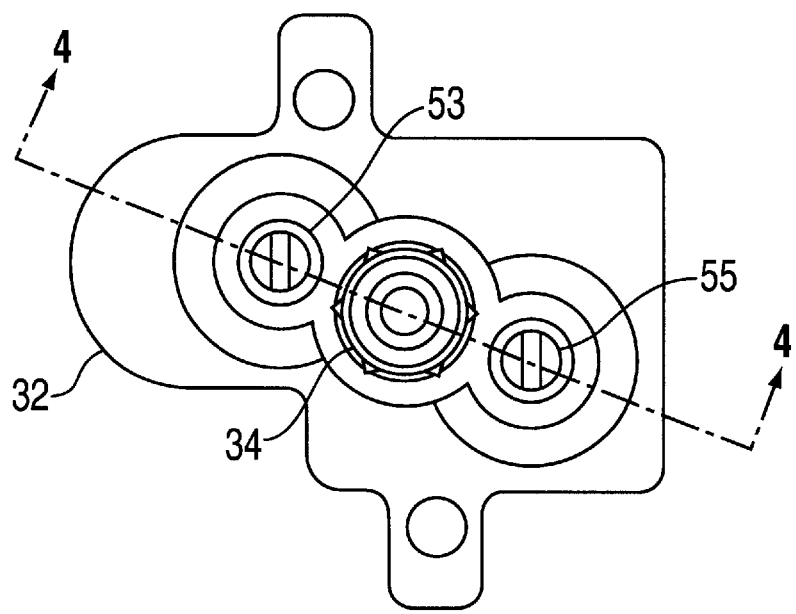
FIG. 3 is a top view of the servo regulator portion of the valve of FIG. 1.

Lever 50 is pivotally attached by a pin 60 between a pair of support projections 33 formed on the underside of cover 32. Adjustable stops, in the form of screws 53 and 55, are provided to limit pivotal movement of lever 50. As seen in FIG. 3, screws 53 and 55 are positioned at an angle to the axis of solenoid 25, and for that reason screw 55 does not appear in FIG. 1, but does appear in FIGS. 2 and 4, where extension 48 of solenoid armature 46 appears behind screw 55.

Screw 53, which controls the low pressure setting, is received in a threaded aperture in cover 32 so that screw 53 may be adjusted from the exterior of the cover to determine the point of contact of arm 52 with the screw. Likewise, screw 55, which controls the high pressure setting, is received in a threaded aperture in cover 32, so that screw 55 may also be adjusted from the exterior of the cover to determine the point of contact of arm 54 with the screw. Reference numeral 34 identifies a vent fitting in cover 32.

The underside of arm 52 bears on the top end of regulator shaft 20. Extension 48 of the solenoid armature, when actuated, pushes against leg 56 of lever 50. A spring 58, shown captured on screw 55, biases lever 50 in a clockwise direction, as seen in FIGS. 2 and 4. This serves as a return spring for solenoid armature 46, although it will be appreciated that the return spring function could be provided equally well with a variety of different spring configurations and/or locations.

In operation, when solenoid 25 is unenergized, lever 50 is rotated to its clockwise (as seen in FIGS. 1, 2 and 4) limit by the action of return spring 58. Regulator spring 14, through regulator shaft 20, also tends to rotate lever 50 in a clockwise direction. However, it is considered preferable to include a separate return spring, rather than to rely on the regulator spring alone to return the solenoid armature. The clockwise limiting position is set by contact of arm 52 with screw 53. In this position, as shown in FIGS. 1, 2 and 4, valve 10 is set for its low pressure output. Specifically, the position of shaft 20 is determined by the setting of screw 53, which, in turn, determines the low pressure set point of the valve.

When solenoid 25 is energized, extension 48 causes lever 50 to rotate in a counter clockwise direction until arm 54 contacts screw 55. This counter clockwise motion pushes shaft 20 downward, and increases the force of regulator spring 14 on diaphragm 15. In this state valve 10 is set for its high pressure output. Specifically, the position of shaft 20 is determined by the setting of set screw 55, which, in turn, determines the high pressure set point of the valve.

It should be noted that although a solenoid is shown and described for causing lever 50 to pivot, other types of actuators could be used to perform the same function. For example, lever 50 could be driven by a rotary actuator extending along axis 51.

One advantage of the applicant's design is that adjustment of the low and high pressure output settings can be made from the exterior of valve 10, without requiring disassembly. Further, adjustments of the low and high pressure settings are entirely independent of one another. Thus, adjustment of the settings can be made in any order, and one setting can be adjusted without necessitating readjustment of the other setting.

A further advantage of the above-described design is that it facilitates conversion of the valve from settings appropriate for one fuel to settings appropriate for a different fuel. This conversion generally requires replacement of regulator spring 14. Such replacement is easily accomplished by removal of cover 32, which also results in removal of lever 50. This provides access to shaft 20 which may be removed with regulator spring 14 by pulling the shaft out along access 22. Spring 14 may then be replaced with a spring having a different spring constant which will produce output pressures appropriate for the desired type of fuel. The regulator portion of the valve is then easily reassembled with the new regulator spring.

Although a specific embodiment of a diaphragm valve with the applicant's unique two-stage servo regulator module has been shown and described for illustrative purposes, a number of variations and modifications within the applicant's contemplation and teaching will be apparent to those skilled in the relevant arts. The invention for which protection is sought is not to be limited by the disclosed embodiment, but only by the terms of the following claims.

The embodiments of an invention in which an exclusive property or right is claimed are outlined as follows:

1. In a pressure regulating valve of the type including a housing assembly defining a servo regulator valve seat and containing a closure member moveable along a first axis toward and away from the servo regulator valve seat by means of a diaphragm responsive to force exerted by a regulator spring between the diaphragm and a spring retainer whose position along the first axis is determined in part by an actuator, the improvement which comprises:

a lever mounted for pivotal movement about a second axis transverse to the first axis, the spring retainer being coupled to said lever at a first location separated from the second axis, whereby the regulator spring biases said lever to rotate about the second axis in a first direction; the actuator being coupled to said lever and operable, when energized, to rotate said lever about the second axis in a second direction opposite the first direction;

a first stop positioned to limit rotation of said lever in the first direction;

a second stop positioned to limit rotation of said lever in the second direction;

said lever is of a configuration having first and second portions projecting in separate directions from the second axis;

the spring retainer is coupled to said lever at a location on the first portion of the lever: and the actuator is a solenoid assembly coupled to said lever at a location on the second portion of the lever.

2. The pressure regulating valve of claim 1 wherein:

said lever is of a configuration having a third portion projecting from the second axis in a direction separate from the directions the first and second positions project from the second axis; and said first and second stops are positioned to contact said lever at locations on the first and third portions of the lever respectively.

3. The pressure regulating valve of claim 2 further including a return spring between said lever and the housing assembly positioned to bias said lever to rotate in the first direction.

4. The pressure regulating valve of claim 3 wherein:

said lever is of a generally T-shaped configuration having first and second arms extending in opposite directions from the second axis, each of the first and second arms having first and second sides generally parallel with the second axis, said lever further having a leg extending from the second axis in a direction generally perpendicular to the first and second arms;

the spring retainer is coupled to said lever at a location on the first side of the first arm thereof;

the actuator is coupled to said lever at a location on the leg thereof;

the first stop is adjustably mounted in the housing assembly, and positioned to contact the second side of the first arm of said lever; and said second stop is adjustably mounted in the housing assembly and positioned to contact the second arm of said lever.

5. In a pressure regulating valve of the type including a housing assembly defining a servo regulator valve seat and containing a closure member moveable along a first axis toward and away from the servo regulator valve seat by means of a diaphragm responsive to force exerted by a regulator spring between the diaphragm and a spring retainer whose position along the first axis is determined in part by an actuator, the improvement which comprises:

a lever mounted for pivotal movement about a second axis transverse to the first axis, the spring retainer being coupled to said lever at a first location separated from the second axis, whereby the regulator spring biases said lever to rotate about the second axis in a first direction, the actuator being coupled to said lever and operable, when energized, to rotate said lever about the second axis in a second direction opposite the first direction;

a first stop positioned to limit rotation of said lever in the first direction;

a second stop positioned to limit rotation of said lever in the second direction;

the housing assembly includes first and second separable housing portions, the first housing portion defining the servo regulator valve seat, and having the diaphragm mounted thereto, the second housing portion having said lever pivotally mounted thereon;

the spring retainer is carried on a shaft slideable within said first housing portion along the first axis toward and away from the servo regulator valve seat, and with the regulator spring, is removable from said first housing portion when said first and second housing portions are separated, whereby regulator springs of different'spring constants can be installed to provide different regulated pressures.

6. The pressure regulating valve of claim 5 wherein the solenoid includes an armature, and is mounted on the housing assembly so that the armature is moveable in a direction transverse to the direction of movement of the shaft in said first housing portion.

* * * * *